US011910286B2

(12) United States Patent
Asawa et al.

(10) Patent No.: US 11,910,286 B2
(45) Date of Patent: Feb. 20, 2024

(54) SYSTEMS AND METHODS FOR INTEGRATED CI/CD AND ORCHESTRATION WORKFLOW IN A 5G DEPLOYMENT

(71) Applicant: DISH Wireless L.L.C., Englewood, CO (US)

(72) Inventors: Manjari Asawa, Cupertino, CA (US); Paul-André Raymond, Reston, VA (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 456 days.

(21) Appl. No.: 17/319,927

(22) Filed: May 13, 2021

(65) Prior Publication Data

US 2022/0201447 A1 Jun. 23, 2022

Related U.S. Application Data

(60) Provisional application No. 63/126,986, filed on Dec. 17, 2020.

(51) Int. Cl.
*H04W 4/02* (2018.01)
*H04W 4/50* (2018.01)
*H04L 67/10* (2022.01)
*G06F 9/54* (2006.01)
*G06F 8/65* (2018.01)
*H04W 24/06* (2009.01)
*H04W 84/04* (2009.01)

(52) U.S. Cl.
CPC ............... *H04W 4/50* (2018.02); *G06F 8/65* (2013.01); *G06F 9/547* (2013.01); *H04L 67/10* (2013.01); *H04W 24/06* (2013.01); *H04W 84/042* (2013.01)

(58) Field of Classification Search
CPC ....... H04W 4/50; H04W 24/06; H04W 24/08; H04W 84/042; G06F 8/65; G06F 9/547; H04L 67/10
See application file for complete search history.

(56) References Cited

U.S. PATENT DOCUMENTS

| | | | |
|---|---|---|---|
| 2017/0034023 A1* | 2/2017 | Nickolov | H04L 43/0817 |
| 2019/0286552 A1* | 9/2019 | Sharma | G06F 11/3688 |
| 2019/0327160 A1* | 10/2019 | Sivaprakasam | G06F 11/3672 |
| 2022/0292012 A1* | 9/2022 | Amin | G06F 11/3692 |
| 2022/0398078 A1* | 12/2022 | Segler | G06F 11/3688 |
| 2023/0031952 A1* | 2/2023 | Kita | H04L 43/50 |

* cited by examiner

*Primary Examiner* — Moustapha Diaby
(74) *Attorney, Agent, or Firm* — Jeremiah J. Baunach; VLP Law Group LLP

(57) ABSTRACT

Systems and methods are disclosed that seamlessly integrates orchestration and CI/CD without requiring duplication of any of the tasks. This method allows creation of test slices as well as operator specific policy control and implementation to implement dynamic test and deployment options that allows different containerized network functions (CNFs) versions to be used for different slices.

20 Claims, 18 Drawing Sheets

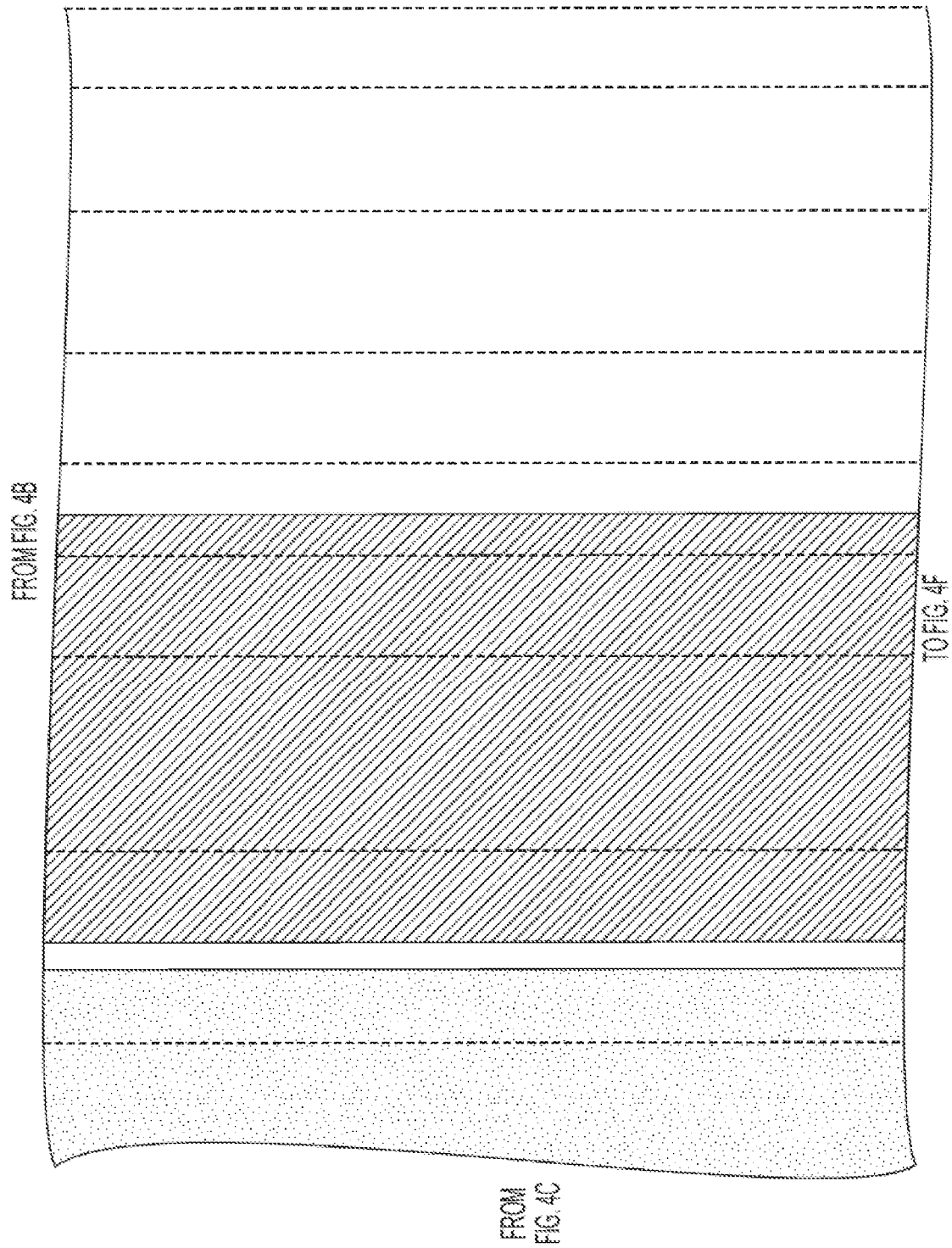

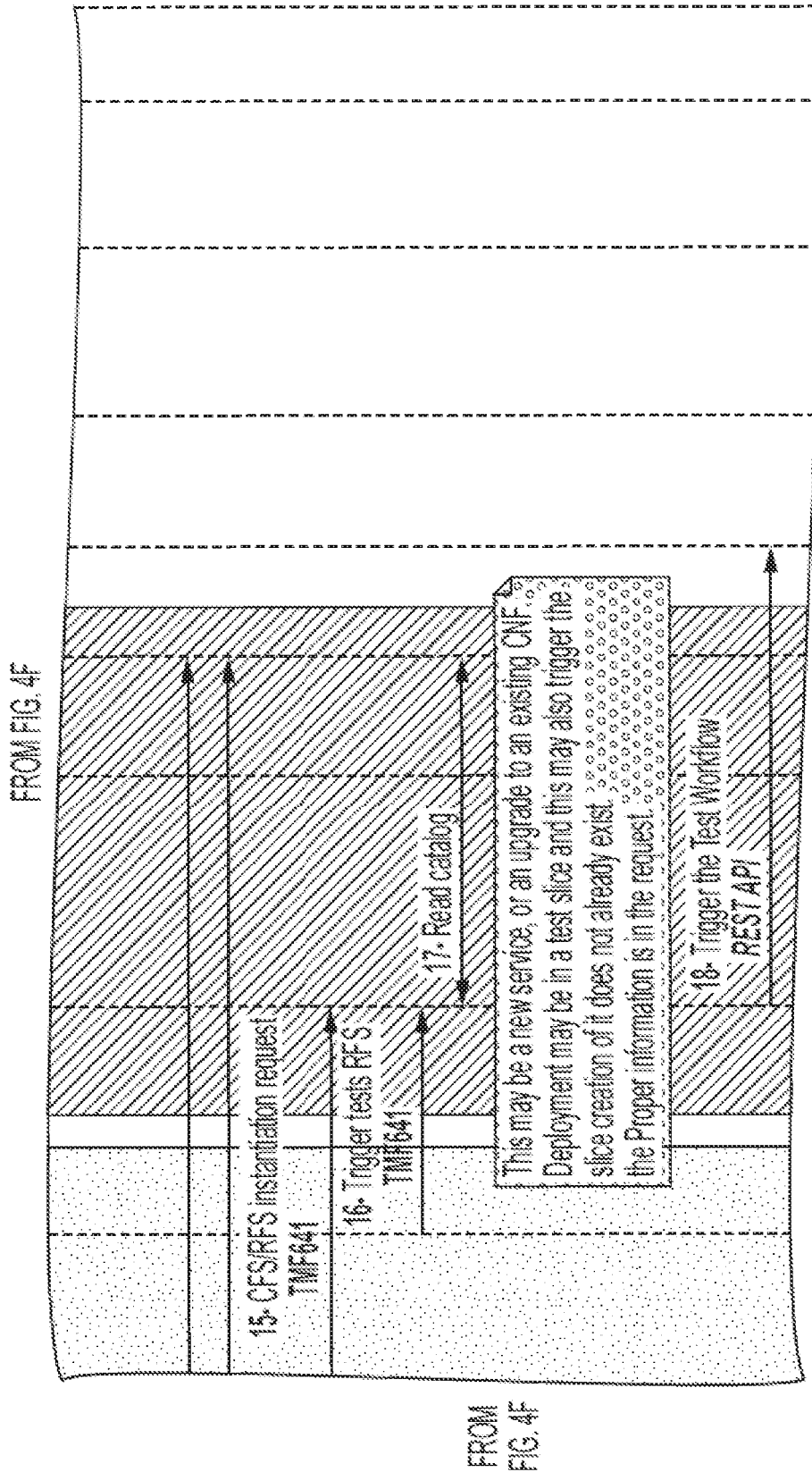

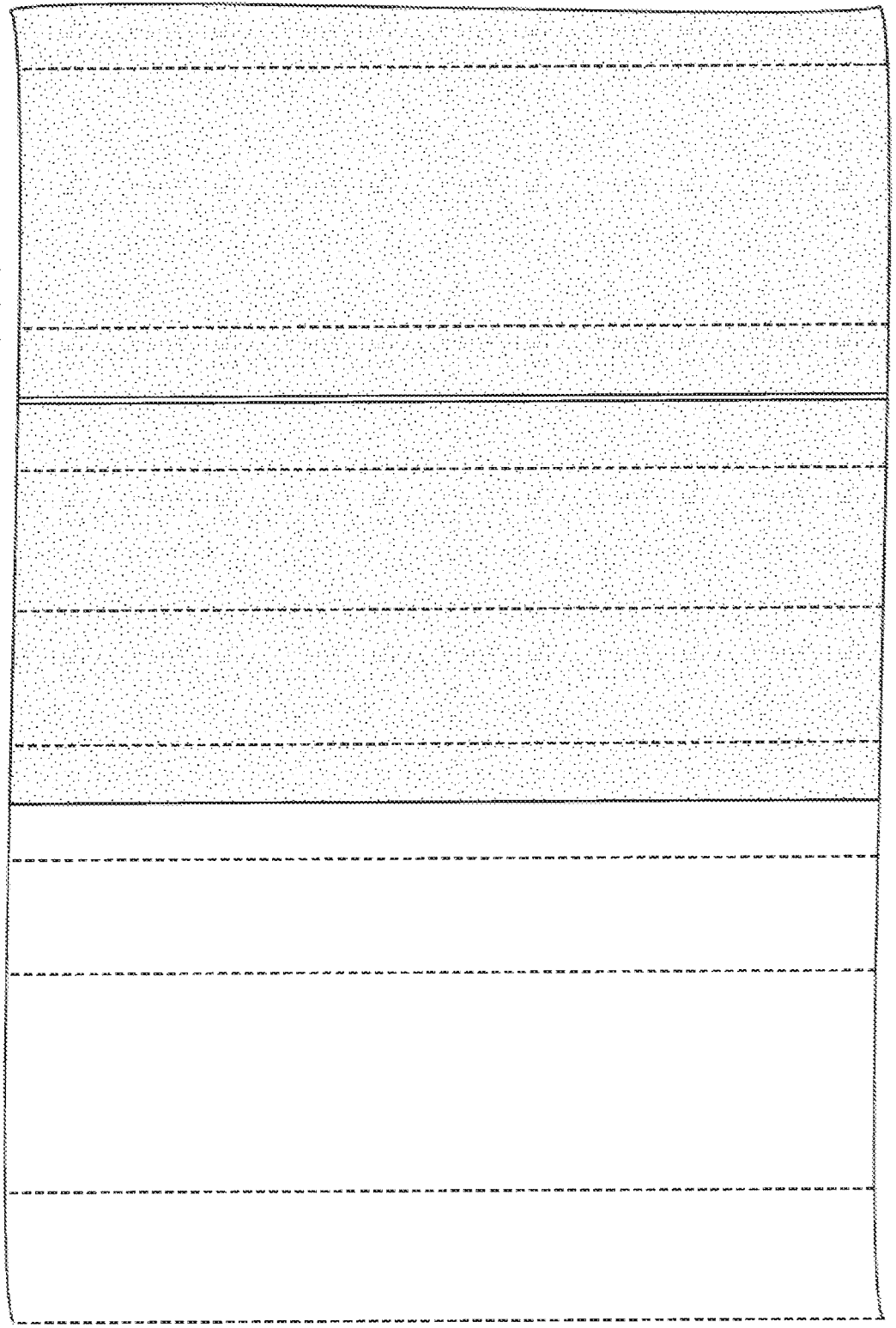

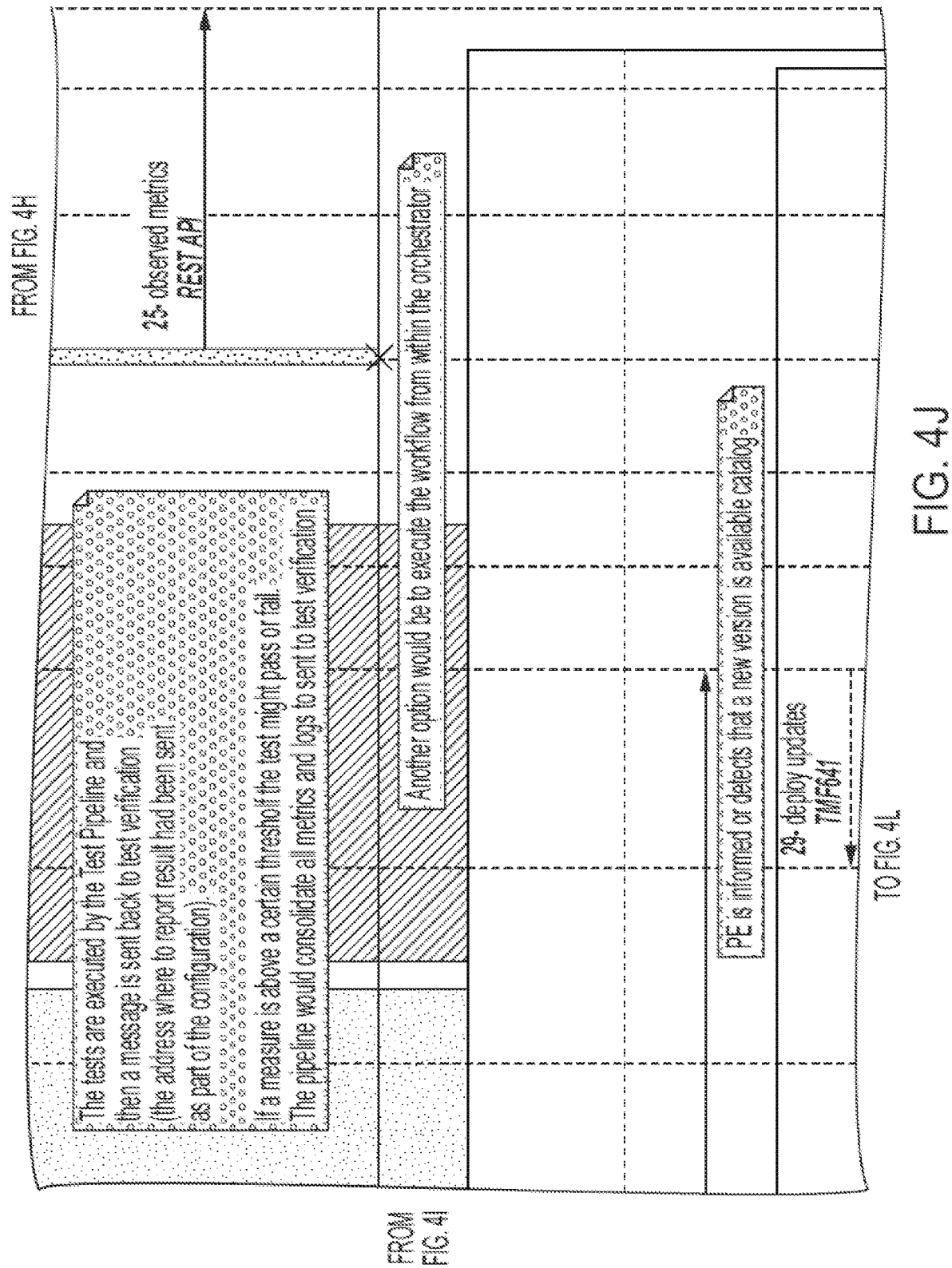

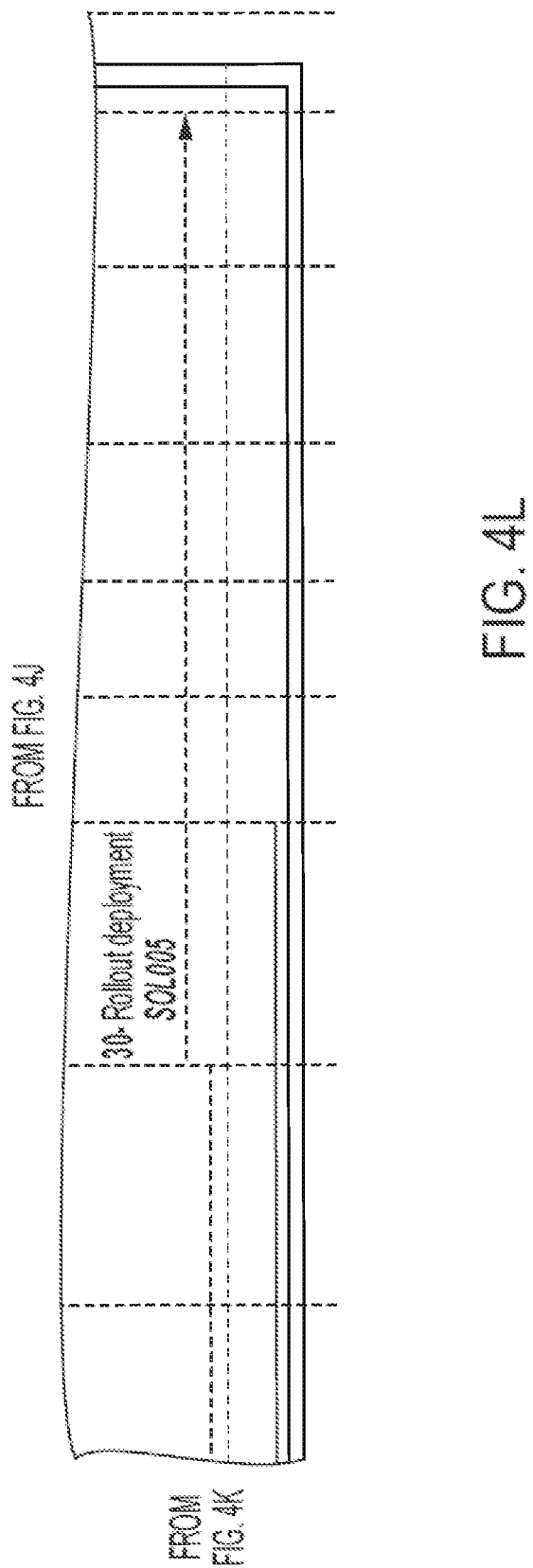

SYSTEMS AND METHODS FOR INTEGRATED CI/CD AND ORCHESTRATION WORKFLOW IN A 5G DEPLOYMENT

BACKGROUND

CI/CD or CICD generally refers to the combined practices of continuous integration and either continuous delivery or continuous deployment. CI/CD bridges the gaps between development and operation activities and teams by enforcing automation in building, testing and deployment of applications, such as applications for the cloud computing and telecommunication systems described below.

Cloud computing is the delivery of computing services, including servers, storage, databases, networking, software, analytics, and intelligence, over the Internet ("the cloud") to offer faster innovation, flexible resources, and economies of scale. Users typically pay only for cloud services they use, helping them lower your operating costs, run their infrastructure more efficiently, and scale as their business needs change.

In telecommunications, 5G is the fifth generation technology standard for broadband cellular networks. 5G networks are cellular networks, in which the service area is divided into small geographical areas called cells. 5G wireless devices in a cell are connected to the Internet and telephone network by radio waves through a local antenna in the cell. The main advantage of the new networks is that they will have greater bandwidth, giving higher download speeds, (e.g., 10 gigabits per second (Gbit/s)). Due to the increased bandwidth, it 5G networks do not exclusively serve cellphones like previous cellular networks, but may also be used as general internet service providers for laptops and desktop computers, competing with existing ISPs such as cable internet, and also make possible new applications in internet of things (IoT) and machine to machine areas.

The industry consortium setting standards for 5G is the 3rd Generation Partnership Project (3GPP). It defines any system using 5G NR (5G New Radio) software as "5G". Minimum standards are set by the International Telecommunications Union (ITU), such as specified in the ITU's IMT-2020 document.

BRIEF SUMMARY

With the development of disaggregated, cloud based architectures for 5G networks, there is increasing desire to apply methods of the cloud to 5G service automations for deployment and lifecycle management. Wireless networks have traditionally used orchestration to handle the complexity of service deployment and service chaining, while the cloud had relied on CI/CD methods to deploy new versions of the services and tests quickly. While CI/CD methods provide agility, they are not able to address the complexity of 5G service deployments by themselves. Hence, for wireless networks to take advantage of the agility achieved with CI/CD methods, the orchestration and CI/CD methods need to be integrated well to address the complexity of 5G service deployment while taking advantage of development and operations (Devops) agility methods that come with CI/CD methods of cloud.

The present disclosure describes systems and methods that seamlessly integrates orchestration and CI/CD without requiring duplication of any of the tasks. This method allows creation of test slices as well as operator specific policy control and implementation to implement dynamic test and deployment options that allows different containerized network function (CNFs) versions to be used for different slices.

BRIEF DESCRIPTION OF THE SEVERAL VIEWS OF THE DRAWINGS

FIGS. 4A-4L comprise a workflow diagram showing an example of an end-to-end workflow with CI/CD and Orchestration integration, according to various embodiments of the present disclosure.

DETAILED DESCRIPTION

Figure 1:
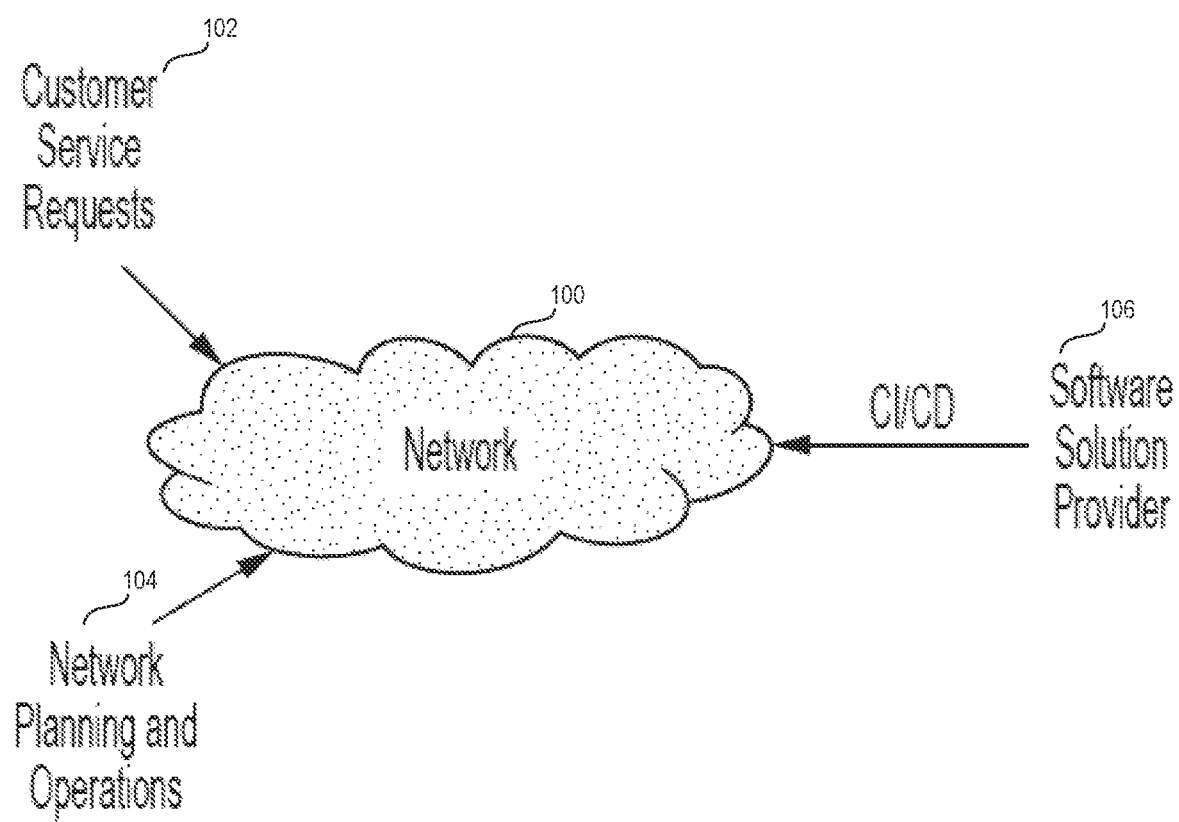
FIG. 1 is a block diagram showing an example networked environment including causes of deployment changes including software lifecycle, network plans and customer demands, according to various embodiments of the present disclosure.

FIG. 1 is a block diagram showing an example networked environment implemented over an example electronic communications network 100 including causes of deployment changes including software lifecycle, network plans and customer demands, according to various embodiments of the present disclosure. FIG. 1 shows how the three reasons a change may be made in the network may require three interfaces and corresponding workflows. In various embodiments, these may be for customer service requests 102, network and planning operations 104 and for software solution providers 106. It is important to note that the above changes are not made in isolation. For example, a new software deployment, depending on the changes, may require update for some slices in case of a new feature or update to all slices for which it is deployed in case of security vulnerability. All of these cases must be supported with the same workflow to the extent possible.

There are multiple reasons why a change may need to be applied to a network:

1. Software vendors regularly release updated versions of their software to add new features, security patch, bug fixes etc. This new software needs to be tested and deployed in the network.

2. The Service Providers' team often needs to update the network to support new regions, new equipment, new topology, etc., to accommodate changing traffic requirements and patterns. This requires configuration changes and may require new software.

3. Customers are increasingly asking for personalized, tailored services, particularly if they are enterprises. To support them, specific software or new release of software customized for that service or slice may be required.

A major challenge for the operator is to manage the complexity of the network in achieving full automation.

Embodiments of the present disclosure recognize that many of the functions required of the software lifecycle, network plans and customer demands interfaces have a lot in common. For example, the workflow of service order management (SOM) orders deployment of customer service has a lot in common to the CI/CD pipeline workflow for software testing. By exploiting these commonalities, the process can be integrated and provided in a much more uniform way. In particular, to the embodiments described herein use the orchestration platform to guide the deployment and enable slicing and service chaining while utilizing CI/CD framework for configuration and software changes. The commonalities and high level components are shown in FIG. 2.

Figure 2:
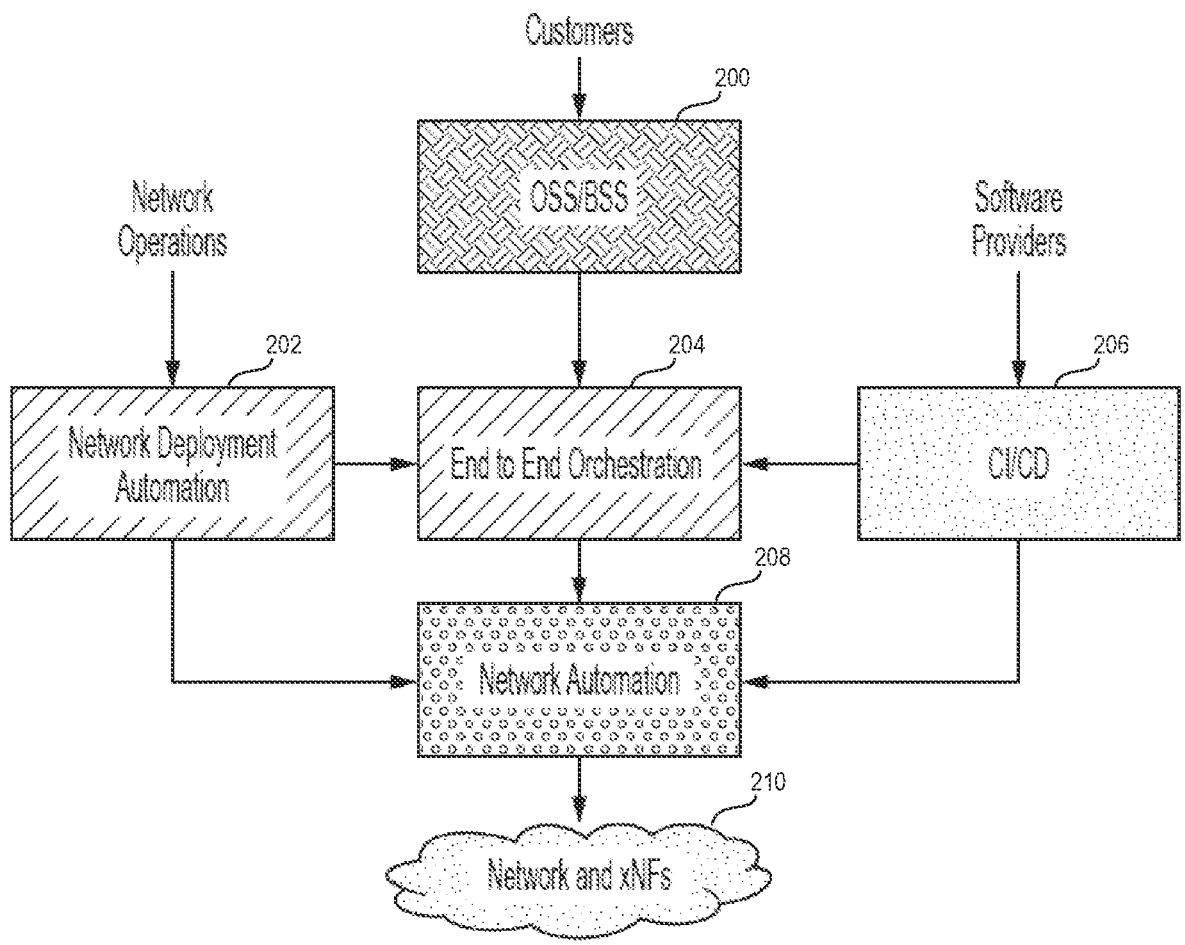
FIG. 2 is a block diagram showing high level system components, according to various embodiments of the present disclosure.

FIG. 2 is a block diagram showing high level system components, according to various embodiments of the present disclosure. These components include an operations support system and business support system (OSS/BSS) 200. The distinction emphasizes a separation of concerns between maintaining network operations and the business around which that network is built. Communications service providers may support a broad range of services and functions with their OSS/BSS. BSS primarily comprises order capture, Customer Relationship Management and telecommunications billing whereas OSS covers Order Management, Network Inventory Management and Network Operations. These components also include network deployment automation 202, end to end orchestration 204, CI/CD 206, and network automation 208. The embodiments described herein provide a way to implement new functionality in the network and extended network file system (xNFs) 210 to bridge the gap between traditional CI/CD implementation and orchestration. The embodiments described herein are centered on three new software functional components as described herein which are integrated with each other and include an interface for customer service requests 102, an interface for network and planning operations 104 and an interface for software solution providers 106. The components may also be integrated with orchestration or could be integrated in the CI/CD toolsets, thereby allowing multiple implementation options, as long as the functionalities of these components are all supported.

Principles of Implementation:
1. Existing workflows and interfaces are built-upon rather than new workflows or interfaces being introduced. Existing interfaces such as the TM Forum 641 (TMF641) Service Ordering API REST Specification R18.5.1, are already used for service and customer activation and various embodiments described herein use them to activate orchestration from CI/CD pipeline for service testing and for test user creation. However, in various embodiments, other interfaces may be used. For instance TMF640 and TMF664 are other APIs that could be used to achieve very similar results in other embodiments.
2. Software in the catalog does not need to change after testing, the label might change. Elements in the catalogues can have labels, alpha, beta, and gamma. The label may indicate the stage of the software version. New versions can be pushed if failures or results of test are not satisfactory, in that case it will be a new CI/CD trigger. If the results are satisfactory, then only label will be changed to indicate such.
3. The embodiments described herein enhance Customer Facing Service/Resource Facing Service (CFS/RFS) definition to include a parameter called test to define the activation via CICD interface.

Various acronyms used in the present disclosure are expanded below:
CFS/RFS: Customer Facing Service/Resource Facing Service
NSMF: Network slice management function
NSSMF: network slice subnet management function
CNF: containerized network function
PNF: physical network function
UPF: user plane function
AMF: access and mobility management function
SMF: session management function
SMSC: short message service center
MMSC: multi-media message service center
IMS: IP multi-media service
CSAR: Cloud service archive Detailed Architecture The focus of most implementations is on the interfaces for Network Deployment (typically centered on European Telecommunications Standards Institute (ETSI) GS NFV-SOL 005 specification (SOL005) approved by the Network Functions Virtualization (NFV) ETSI Industry Specification Group (ISG)) and the interfaces for Customer Service order deployment (typically centered on TMF specification and interfaces such as 641, 640 etc.). However, in various embodiments, other interfaces may be used. For instance TMF640 and TMF664 are other APIs that could be used to achieve very similar results in other embodiments. As shown below, one embodiment focuses on the integration of CI/CD and orchestration by taking advantage of the existing interfaces and enhanced service catalogue with new software versions via appropriate labeling and enhance the policy engine to include CI/CD policy interaction.

Figure 3A:
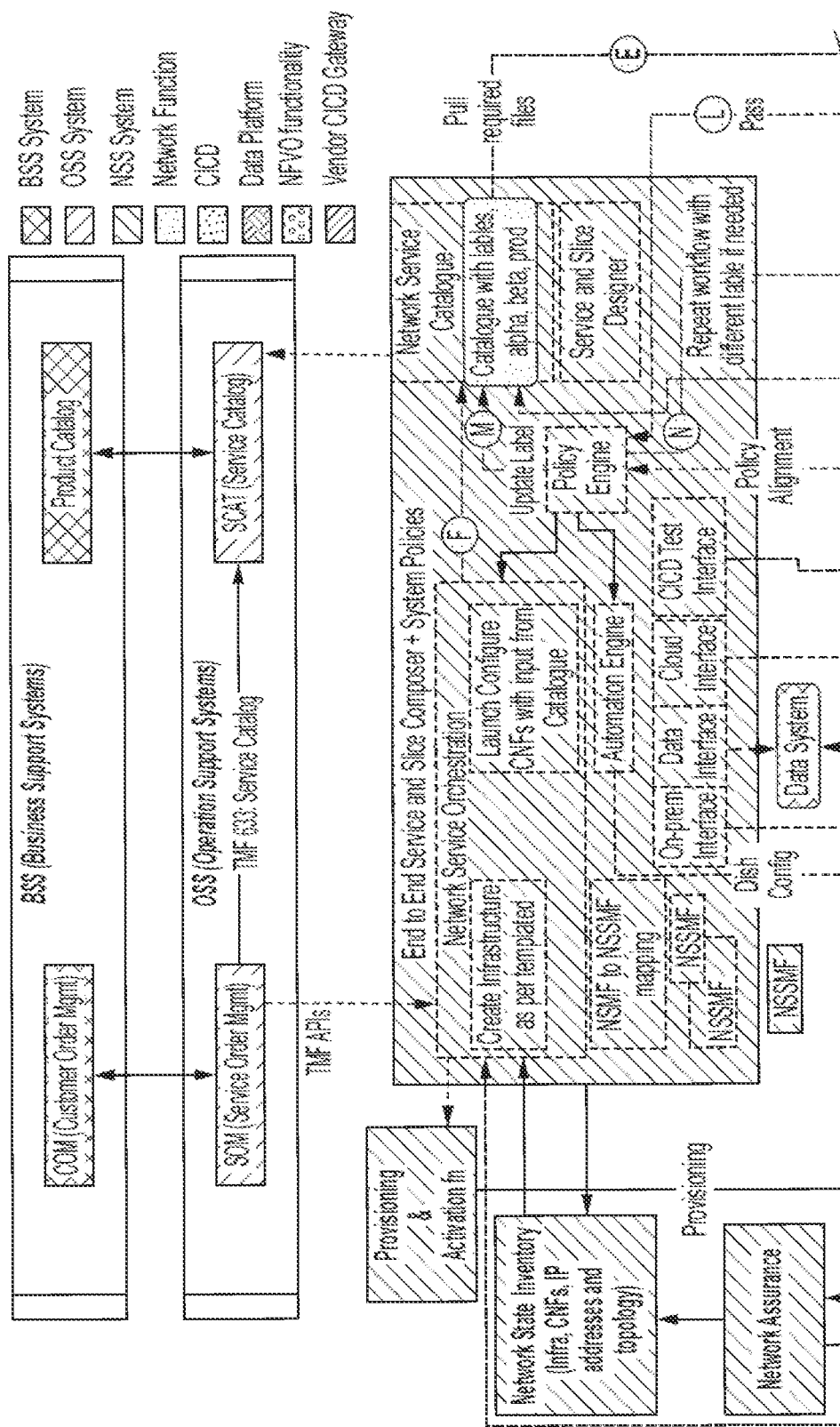
FIGS. 3A-3B comprise a block diagram showing details of CI/CD and orchestration integration, according to various embodiments of the present disclosure.
Figure 3B:
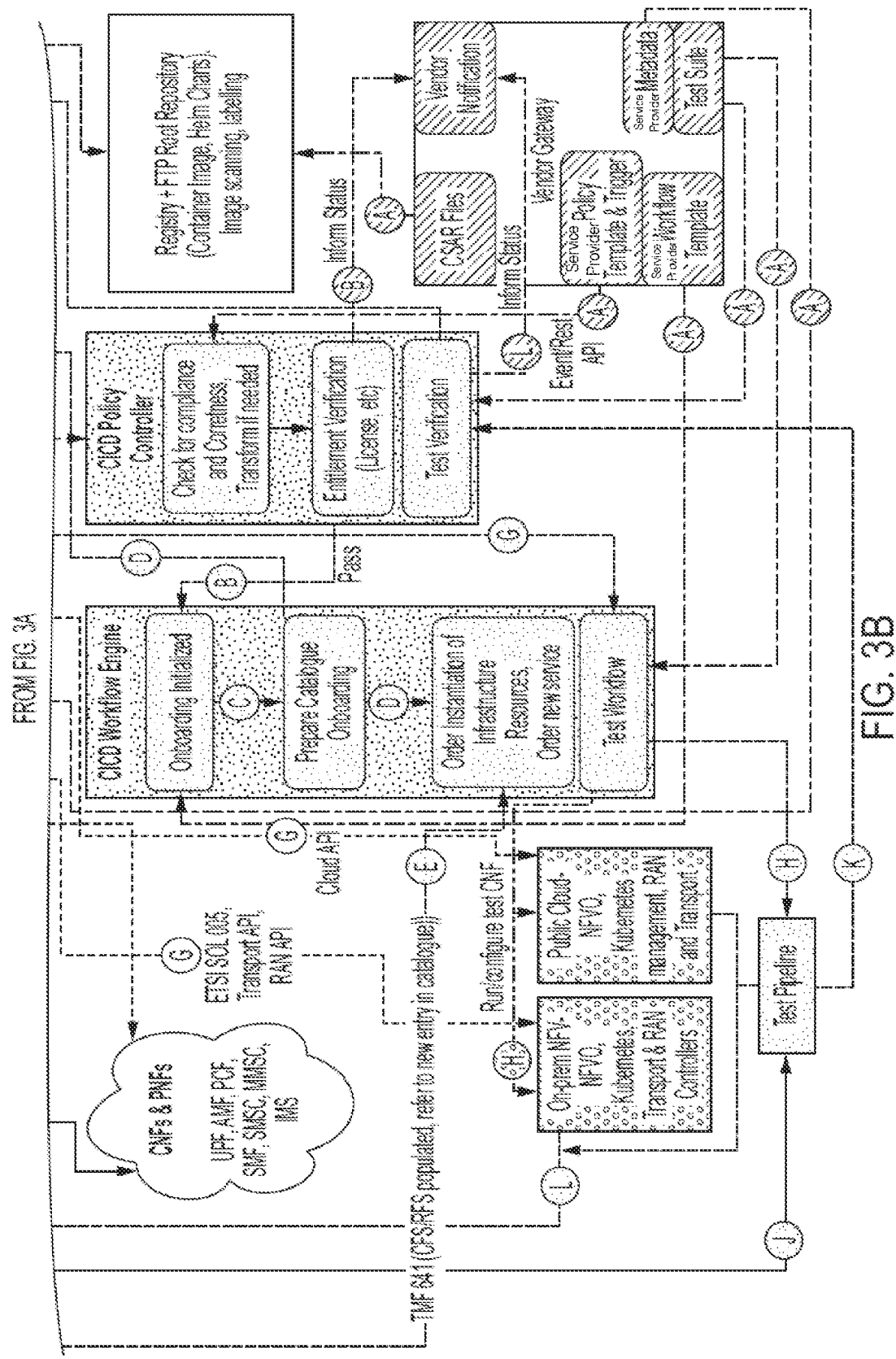
Figure 4A:
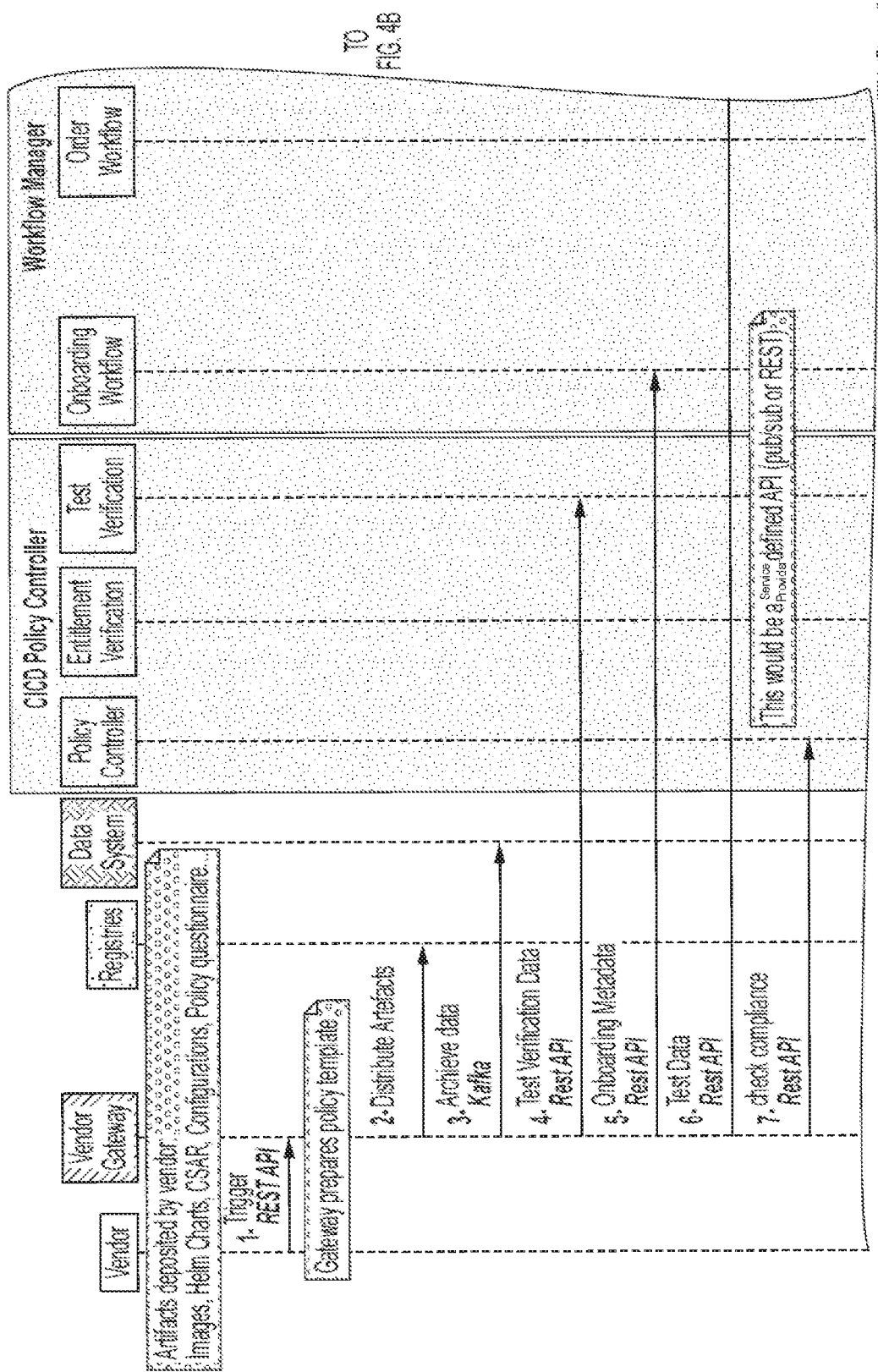
Figure 4B:
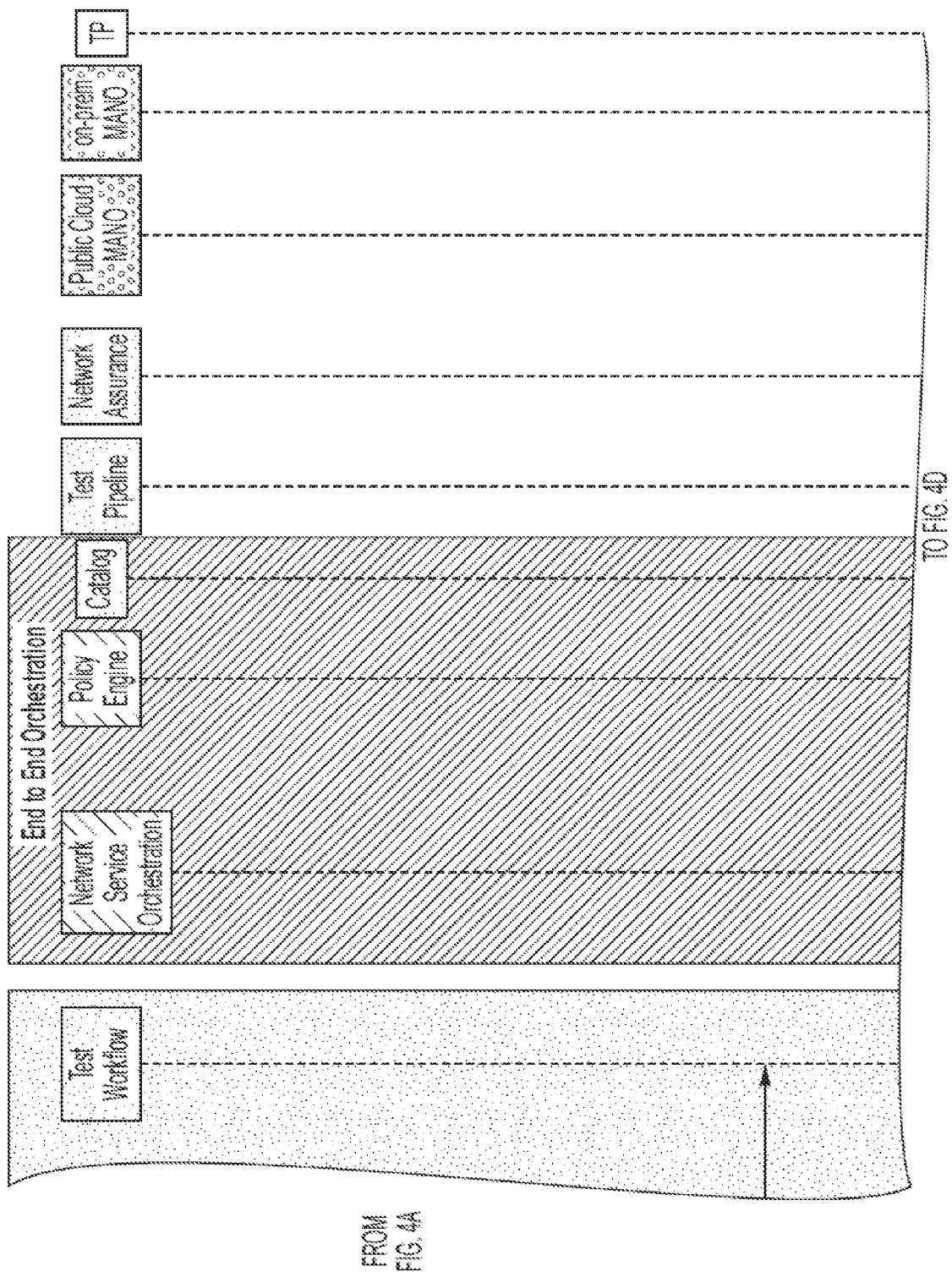
Figure 4C:
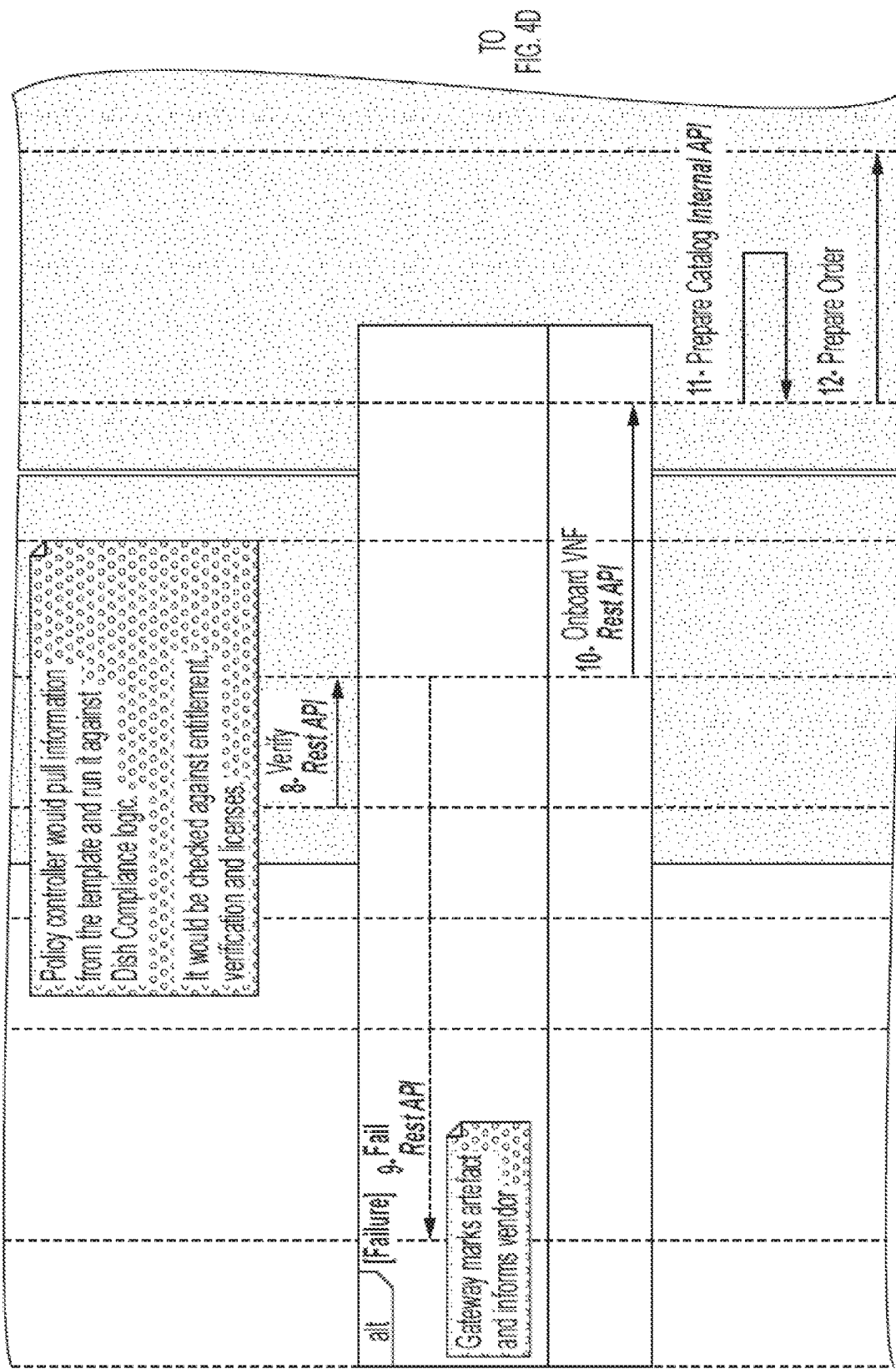
Figure 4E:
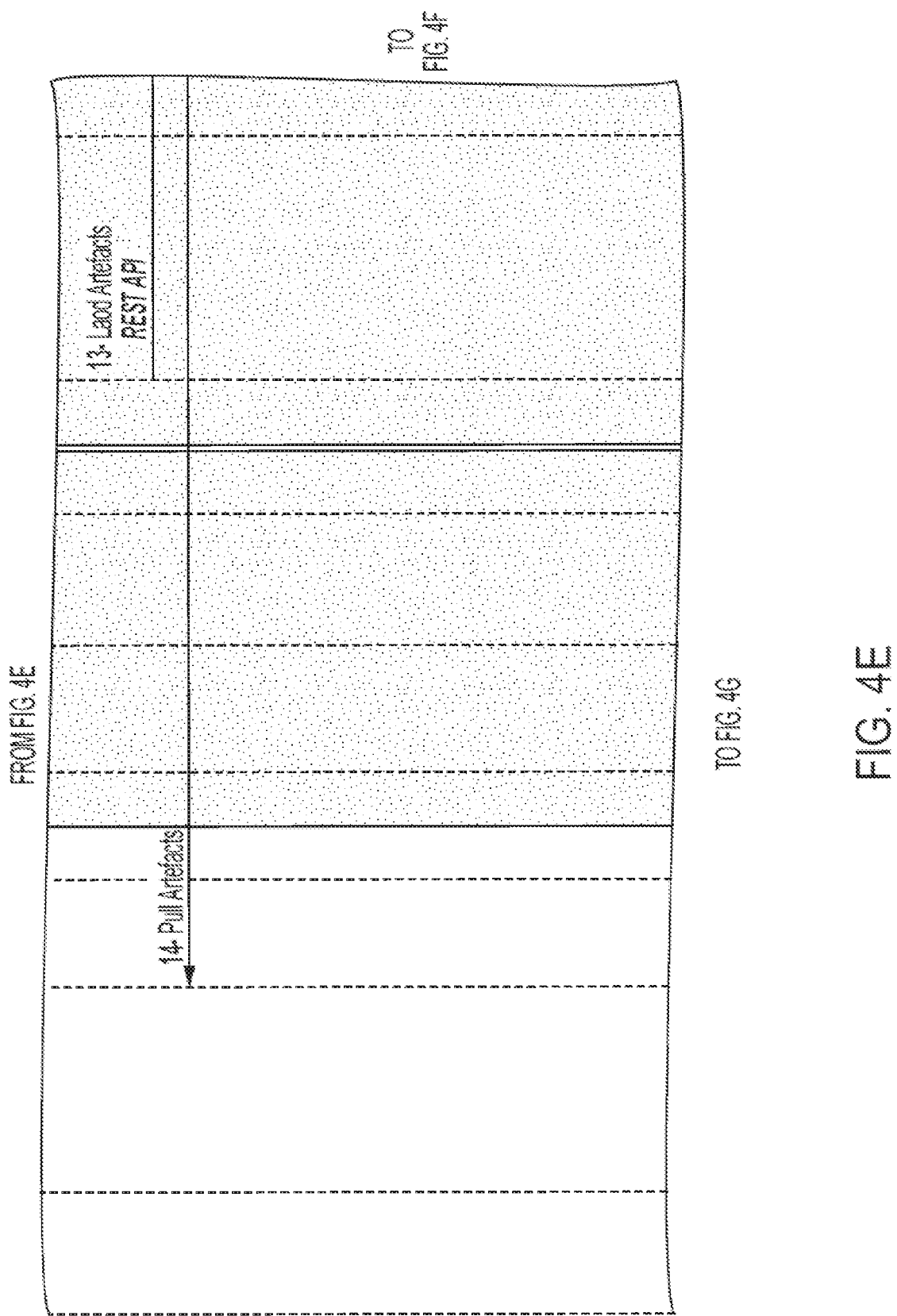
Figure 4H:
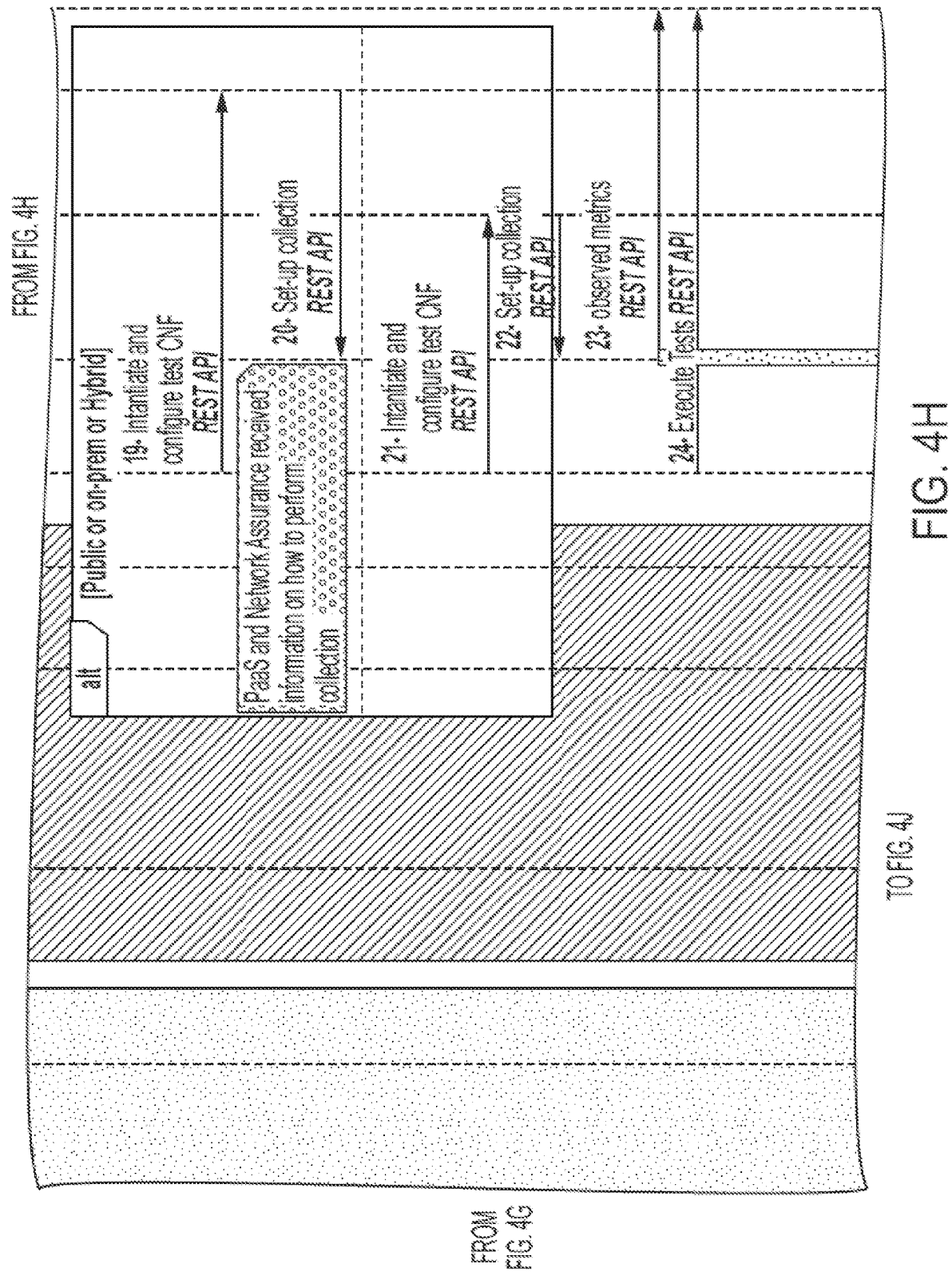
Figure 4I:
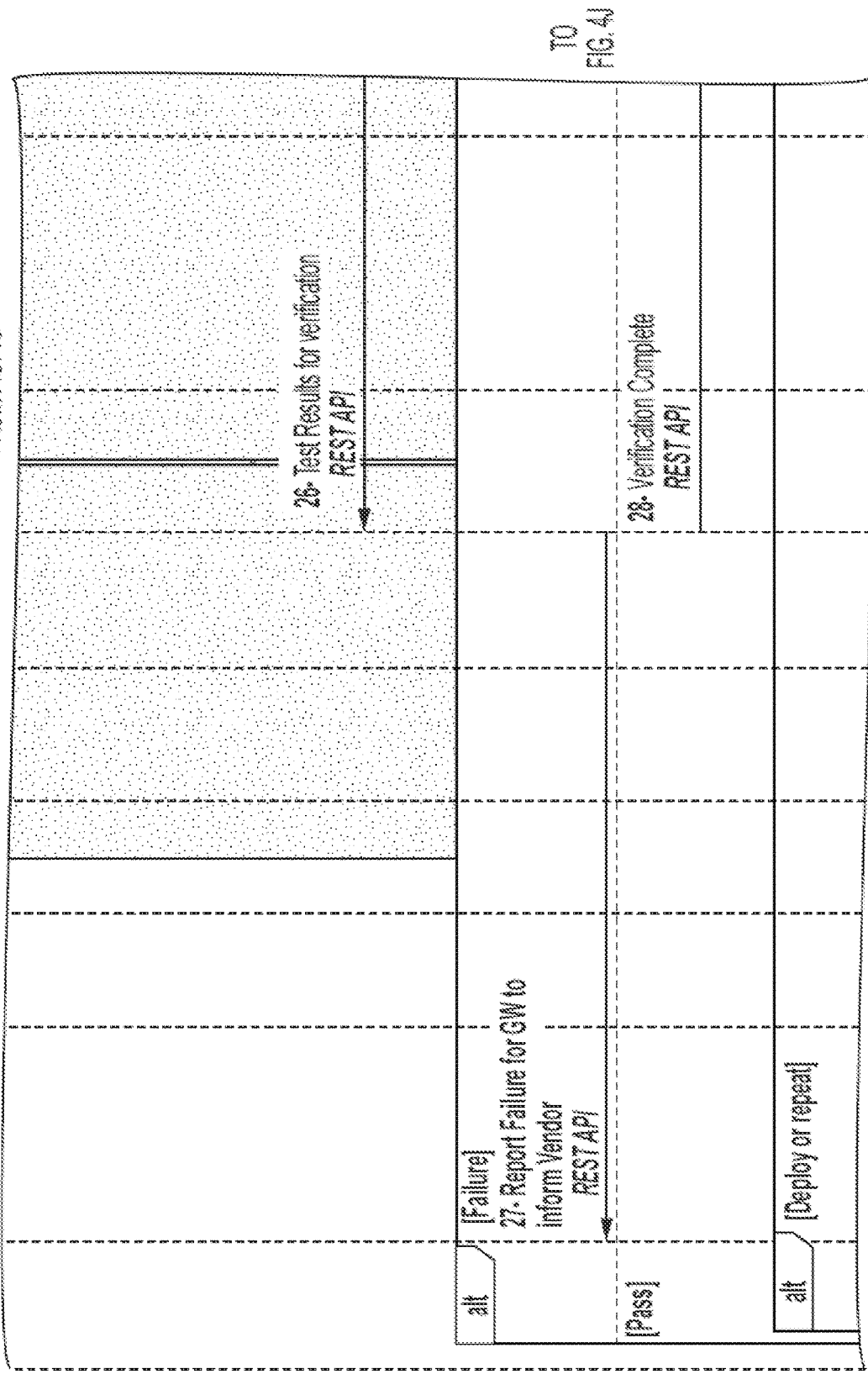
Figure 4K:
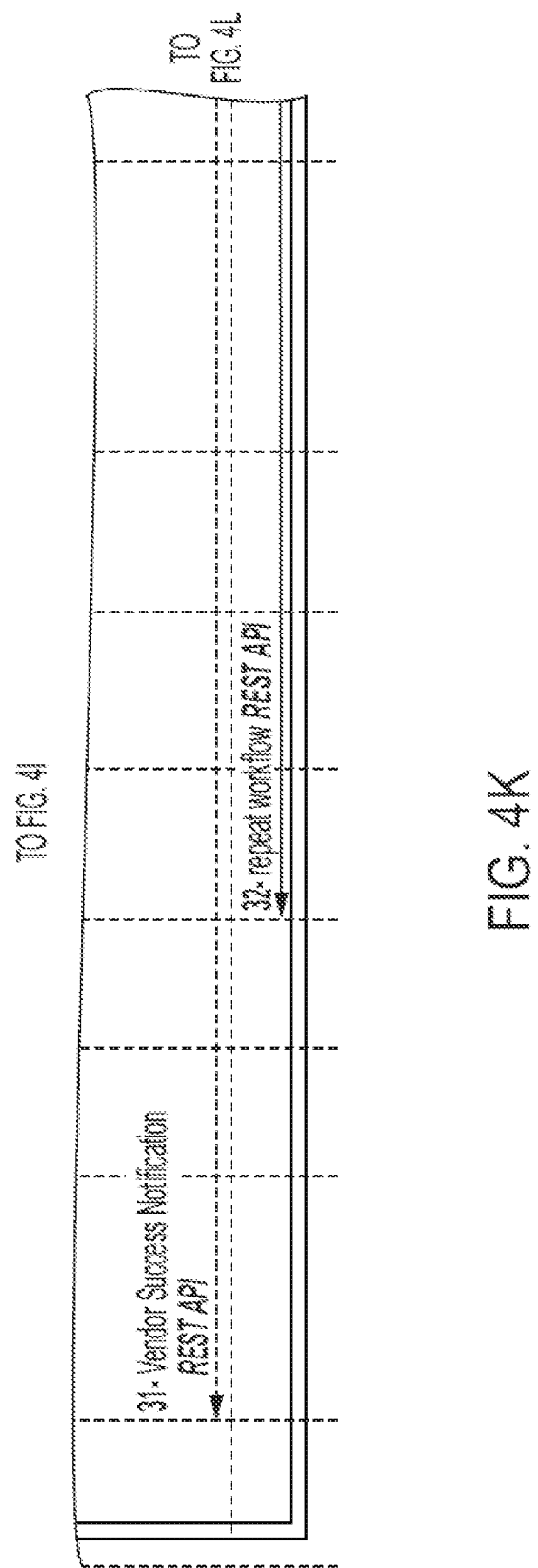

FIGS. 3A-3B comprise a block diagram showing details of CI/CD and orchestration integration, according to various embodiments of the present disclosure. FIGS. 3A-3B outline the detail of this architecture and interfaces. The arrows shown in FIGS. 3A-3B illustrate relationships and/or direction of associated dataflow between the respective components and, in an example embodiment, the letter assigned to various arrows indicates an example order (alphabetically according to the assigned letter) in which the dataflow may occur or in which relationships may be established between the respective components.

FIGS. 3A-3B also illustrate how these new interfaces may be implemented. In particular, it shows that the, CI/CD interface to orchestration is made up of four sub interfaces: an interface to service orchestrator, catalog interfaces, an interface to a registry, and an interface to policy. For completeness, following are descriptions of components that are used for customer triggered service deployment and the associated enhancements to support CI/CD. An example of a registry is Harbor. Harbor Registry is an enterprise-class registry server that stores and distributes container images. Harbor allows a system to store and manage images for use with VMware Tanzu Kubernetes Grid Integrated Edition (TKGI).

Component Descriptions and Detailed Procedure

At a high level, the CI/CD and orchestration integration process includes the following steps.
1. Artifacts are pulled from vendor gateway to appropriate service provider blocks.
2. Containerized network function (CNF) information is populated into the service catalog.
3. Infrastructure is built: via clusters, via namespaces (depending on levels of isolations)

4. Service is built on it. The service could be a slice, a CNF, multiple CNFs etc.
5. Tests are run along with launch of additional test and analytics functions
6. Logs/traces/events are collected and analyzed.
7. Depending on the outcome of the analysis, next steps are decided.
8. Vendor is informed of the outcome of analysis.

The Network Service Orchestrator is at the heart of end-to-end service and slice management. Its role includes creating and managing users, service and slice instances as requested by the operations support systems (OSS) SOM Platform. Traditionally, the Network Services Orchestrator (NSO) receives requests over TMF641 on its northbound interface with CFS (Customer Facing Service) and RFS (Resource Facing Service) defined as per the TMF 641 specification. However, in various embodiments, other interfaces may be used. For instance TMF640 and TMF664 are other APIs that could be used to achieve very similar results in other embodiments. The RFS can include individual resources or even an entire slice as a resource. The southbound interfaces are based on ETSI SOL, Internet Engineering Task Force (IETF) and Open Radio Access Network (RAN) (Open-RAN or O-RAN) specifications of the O-RAN Alliance to accommodate domains natively.

The embodiments described herein have enhanced the interface to include a CI/CD interface to allow for dynamic changes, and have enhanced its role to include instantiating RFS for a test slice using the same interface as the one used. Not just that, the same TMF interface can be used to create test users, similar to the way a paying subscriber is created, with the business operations and test process distinguished by tags only. Duplicated call-flows for the same task are more error-prone. Keeping them in sync in practice is a challenge and distinguishing the business operations and test process by tags avoids such duplication. This has the advantage that the CI/CD process tests use processes and methods like a real production, and the system only distinguishes the parts under test while keeping everything the same. The existing interface from CI/CD is reused to get the advantage of testing the same workflow as it is triggered from northbound. There is not a different process as to ensure the same workflow is tested. With this architecture, now the northbound interfaces of composer are triggered from both customer centric requests and CI/CD processes. In order to use the Orchestrator for managing the test slice, this slice and the system under test information is captured in the network service catalog. The system allows for this via an interface from CI/CD policy controller and workflow to populate the catalogue after the basic checks are done with the catalogue appropriately labeled. Once the test is triggered, the orchestrator uses the existing interfaces to instantiate infrastructure and associated CNFs and test tools, and the process are similar for both customer requests and for CI/CD based triggers.

FIGS. 3A-3B also include some components that are part of the automation suite for CI/CD and Network Operations. Those include a CI/CD tool suite with a development and operations (Devops) tool such as Gitlab and an image repository. It also includes on-premises and public cloud deployment, which stay the same as in the customer triggered operation, thereby requiring no new interface or changes to them. The deployment of test tools can be done by calling their existing interface from the CI/CD test workflow. The CI/CD gateway represented in FIGS. 3A-3B implements the augmented CI/CD toolset which accommodates not just for delivery of the software by the vendor, but also for delivery of all the test artefacts and the deployment instructions coming from the vendor.

The Policy Controller is the central place where all service provider specific logic on how to handle information coming from Vendors is centralized. The Policy controller sets the bounds on what each vendor is allowed to do and allows for customized policies per vendor. It implements some specific policy related workflows based on logics and rules decided by the service provider. An example of the use of the Policy controller, would be to look at the deployment instructions coming from the vendor (e.g., this new access and mobility management function (AMF) needs to be deployed in a test slice) and to identify the test slices where those deployments are possible based on the current load on the network.

The Workflow Engine is the place where the bulk of the logic lives. It implements coordination between Orchestration, CI/CD and southbound interfaces and triggers catalogue population, TMF based test trigger initiation and infrastructure and test coordination. The workflow engine is tasked with onboarding components, making sure that all the required set-up is in place and triggers appropriate tests and analytics.

The tests are executed by the "Test Pipeline," test data is collected by existing assurance framework and the results are sent back to test verification (the address where to report results can be specified as part of the configuration).

Call-Flow

FIGS. 4A-4L comprise a workflow diagram showing an example of an end-to-end workflow with CI/CD and Orchestration integration, according to various embodiments of the present disclosure. FIGS. 4A-4L illustrate what a deployment use case of a new CNF may be in an example embodiment. It includes the sequence of events involved in getting the CNF tested on a test slice before it is marked ready for deployment (or not). Note the interactions with the inventory are not shown explicitly in the call flow of FIGS. 4A-4L, but are shown in FIGS. 3A-3B. Inventories will be updated by the orchestration platform, and options exist for other systems to update the inventory also.

Implementation Options

The Workflow Engine can be implemented as a stand-alone component or merged with another component (Gitlab or composer) depending on implementation trade-offs The Policy Controller can be implemented as a standalone component or merged with another policy Engine Some interfaces are labelled as REST API (Representational State Transfer Application Programming Interface. REST or RESTful API design is designed to take advantage of existing protocols. While REST can be used over nearly any protocol, it usually takes advantage of HTTP (Hyper Text Transfer Protocol) when used for Web APIs. In various embodiments, there may be existing standard interfaces that are adapted for some of them.

Figure 5:
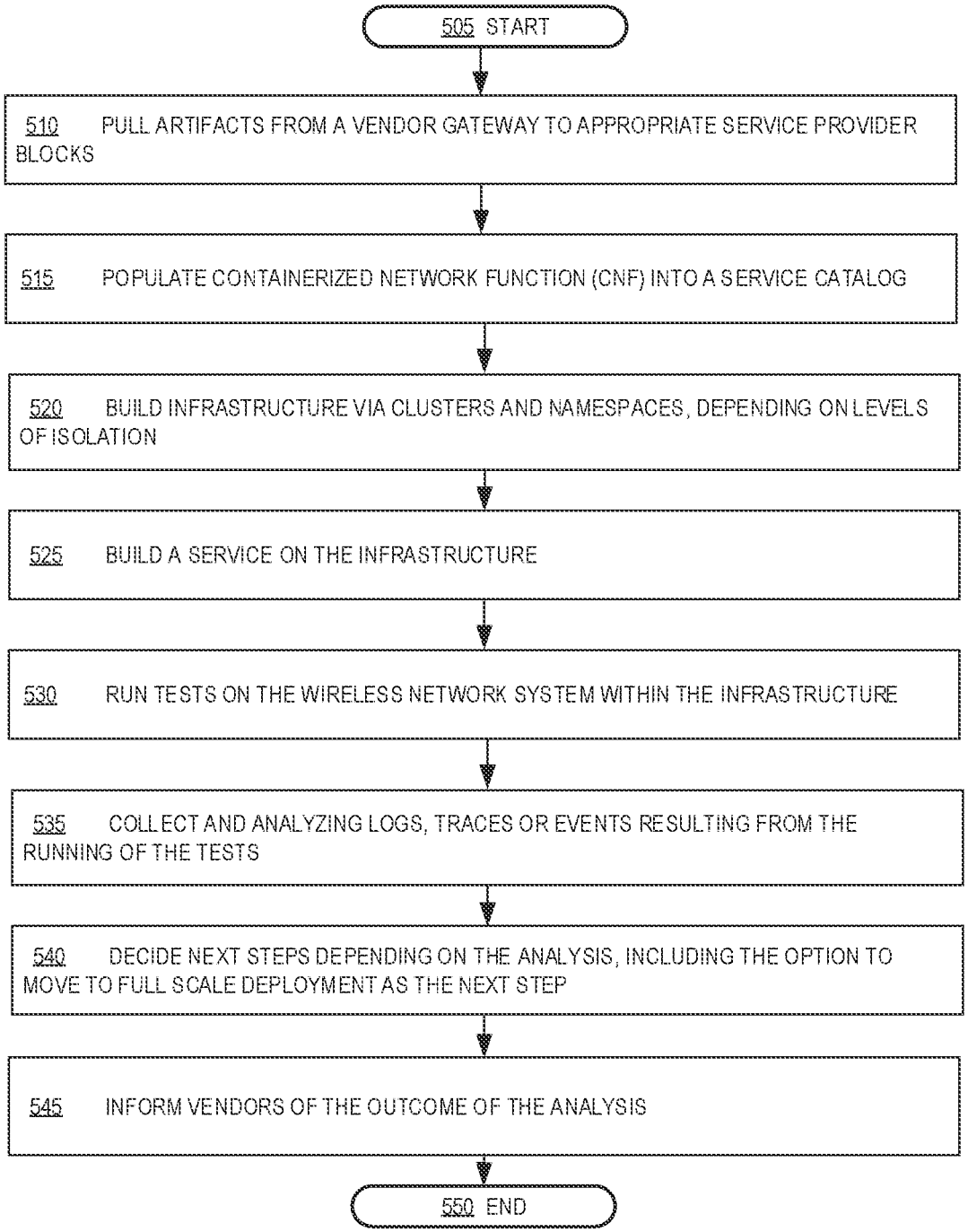
FIG. 5 is a is a flow diagram of an exemplary process for integrated CI/CD and orchestration workflow in a 5G environment, according to various embodiments of the present disclosure.

FIG. 5 is a is a flow diagram of an exemplary process 500 for integrated CI/CD and orchestration workflow in a 5G environment, according to various embodiments of the present disclosure.

The process 500 starts at 505.

At 510, the system electronically pulls artifacts from a vendor gateway to appropriate service provider blocks.

At 515, the system electronically populates Containerized network function (CNF) into a service catalog.

At 520, the system electronically builds infrastructure via clusters and namespaces, depending on levels of isolation.

At 525, the system electronically builds a service on the infrastructure.

At 530, the system electronically runs tests on the wireless network system within the infrastructure.

At 535, the system electronically collects and analyzing logs, traces or events resulting form the running of the tests.

At 540, the system electronically decides next steps depending on the analysis, including the option to move to full scale deployment as the next step. The full scale deployment (step 30 in FIG. 4L) is performed by taking into account all the slices that have been deployed and the status of the network as managed by operations (e.g. are new sites being deployed).

At 545, the system electronically informs vendors of the outcome of the analysis.

The process 500 ends at 550.

Figure 6:
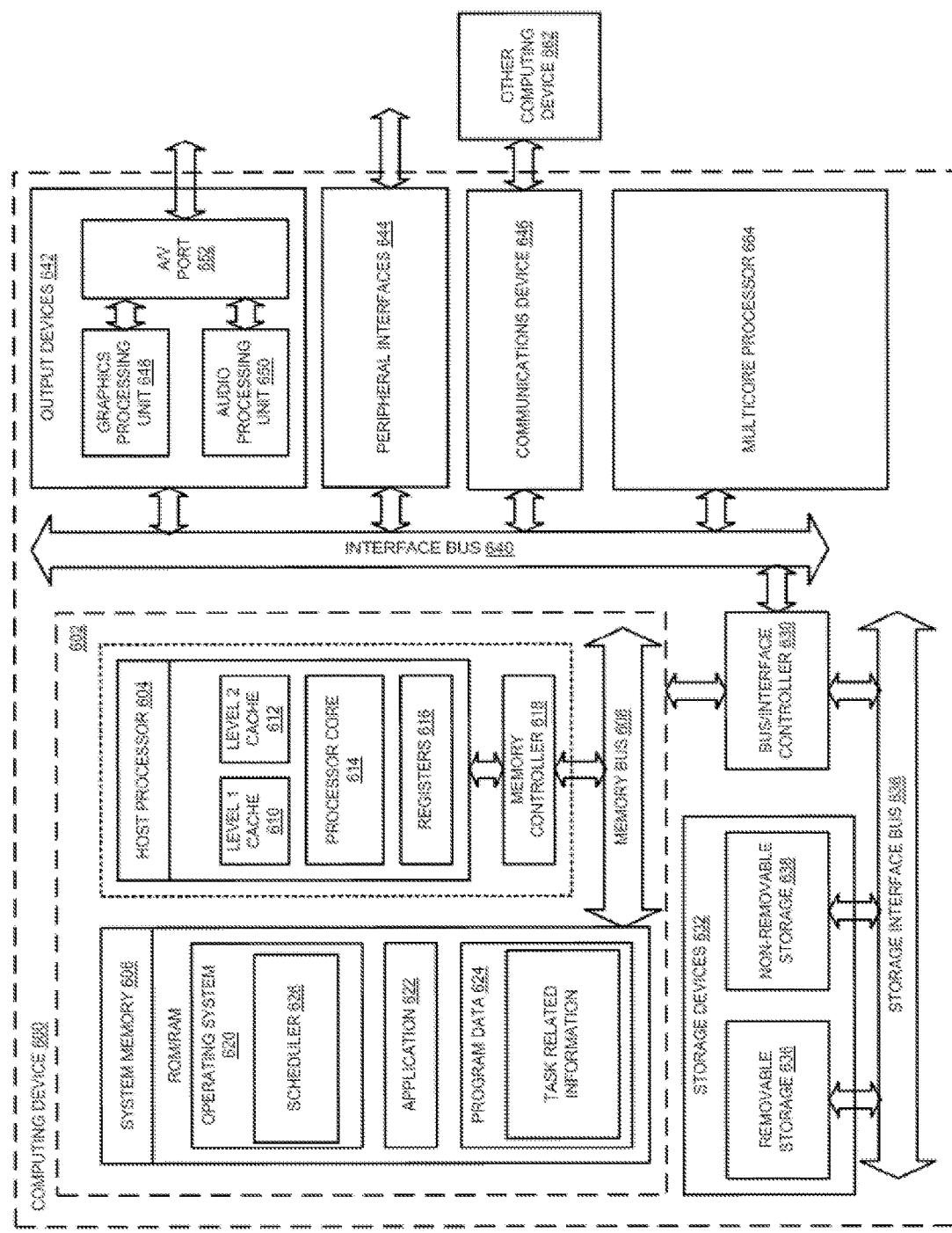
FIG. 6 is a block diagram of an example computing device on which systems and methods for integrated CI/CD and orchestration workflow in a 5G environment may be implemented, arranged in accordance with at least some embodiments of the present disclosure.

FIG. 6 is a block diagram of an example computing device 600 on which systems and methods for integrated CI/CD and orchestration workflow in a 5G environment may be implemented, arranged in accordance with at least some embodiments of the present disclosure. In an example configuration, computing device 600 typically includes one or more host processors 604 and a system memory 606. A memory bus 608 may be used for communicating between host processor 604 and system memory 606.

Depending on the desired configuration, host processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. In some implementations, the operating system 620 may have a scheduler 626 and be arranged to run one or more applications 622 to perform the functions as described herein including those described with respect to at least the processes and functionality shown in FIGS. 1-5. Also, application 622 may be arranged to operate with program data 624 on operating system 620. Program data 624 may include task related information, such as, without limitation, task data related to executing instructions for performing for continuous integration and continuous delivery (CI/CD) and orchestration integration as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices and hard-disk drives (HDD), optical disk drives such as compact disk (CD) drives or digital versatile disk (DVD) drives, solid state drives (SSD) to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic disk storage or other magnetic storage devices, or any other non-transitory storage medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller or a parallel interface controller, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller, which may be arranged to facilitate communications with one or more other computing devices 662, over a network communication link, such as over the network shown in FIG. 1, via one or more communication ports. In some implementations, computing device 600 includes a multi-core processor 664, which may communicate with the host processor 604 through the interface bus 640.

The network communication link may be made over communication system 106 and may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a server, a network device, a portion of a small-form factor portable (or mobile) electronic device such as a cell phone, a personal data assistant (PDA), tablet device, an application specific device, or a hybrid device that include any of the above functions. Computing device 600 may also be implemented as a personal computer including both laptop computer and non-laptop computer configurations.

There is little distinction left between hardware and software implementations of aspects of systems. The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes, systems, or other technologies are deployed. For example, if an implementer determines that speed and accuracy are paramount, the implementer may opt for a mainly hardware or firmware vehicle. If flexibility is paramount, the implementer may opt for a mainly software implementation. Yet again, alternatively, the implementer may opt for some combination of hardware, software, with or without firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flash drives, a hard disk drive, a Digital Video Disk (DVD), a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A data processing system may be implemented utilizing any suitable commercially available components, such as those found in data computing/communication and/or network computing/communication systems.

Computing device 600 may be in networked environment, such as the environment shown in FIG. 1 and/or FIG. 2, in which systems and methods for continuous integration and continuous delivery (CI/CD) and orchestration integration may be a part, or in which they may be implemented, according to one illustrated embodiment. Communications device 646 may be connected to and communicate over a computer/telecommunications network, telecommunications network, computer network or combination of telecommunications and computer networks, that enables communication between the various devices connected to the network, including, but not limited to, computing device 600 and other computing devices that may comprise the systems described herein. For example, the communications network may include one or more of: a 5G network, the internet, a local area network that uses wireless fidelity (Wi-Fi) high frequency radio signals to transmit and receive data over distances of a few hundred feet. A local area network of the communications network may be a wireless local area network (WLAN) based on the Institute of Electric and Electronic Engineers (IEEE) 802.11 standards. However, other wired and wireless communications networks and protocols may be used to link the various devices and systems shown in FIG. 6.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for continuous integration and continuous delivery (CI/CD) and orchestration integration in a wireless network system, the method comprising:
   electronically pulling artifacts from a vendor gateway to appropriate service provider blocks;
   electronically populating containerized network function (CNF) into a service catalog;
   electronically building infrastructure via clusters and namespaces, depending on levels of isolation;
   electronically building a service on the infrastructure;
   electronically running tests on the wireless network system within the infrastructure;
   electronically collecting and analyzing logs, traces or events resulting from the running of the tests;
   electronically deciding next steps depending on the analysis; and
   electronically informing vendors of the outcome of the analysis.

2. The method of claim 1 wherein the service is a slice, a containerized network function (CNF), or multiple CNFs.

3. The method of claim 2 further comprising a Network Services Orchestrator (NSO) receiving requests on a northbound interface with a Customer Facing Service (CFS) and a Resource Facing Service (RFS) defined according to an application programming interface (API).

4. The method of claim 3 wherein the RFS includes individual resources.

5. The method of claim 3 wherein the RFS includes an entire slice as a resource.

6. The method of claim 5 wherein a southbound interface is based on European Telecommunications Standards Institute (ETSI) SOL, Internet Engineering Task Force (IETF) and Open Radio Access Network (RAN) specifications of the O-RAN Alliance to accommodate domains natively.

7. The method of claim 1 wherein a CI/CD interface to orchestration that implements the continuous integration and continuous delivery (CI/CD) and orchestration integration comprises four sub interfaces including: an interface to service orchestrator, a catalog interface, an interface to a registry, and an interface to policy.

8. The method of claim 7 further comprising:
the CI/CD interface instantiating RFS for a test slice; and
the CI/CD interface creating test users.

9. The method of claim 1 wherein business operations of the service and a test process for running the tests are distinguished by tags only.

10. A system comprising:
at least one computer processor;
a network interface for receiving information; and
a non-transitory memory communicatively coupled to the computer processor having computer-executable instructions stored thereon that when executed by the computer processor cause the computer processor to perform:
electronically pulling artifacts from a vendor gateway to appropriate service provider blocks;
electronically populating containerized network function (CNF) into a service catalog;
electronically building infrastructure via clusters and namespaces, depending on levels of isolation;
electronically building a service on the infrastructure;
electronically running tests on the wireless network system within the infrastructure;
electronically collecting and analyzing logs, traces or events resulting from the running of the tests;
electronically deciding next steps depending on the analysis; and
electronically informing vendors of the outcome of the analysis.

11. The system of claim 10 wherein the service is a slice, a containerized network function (CNF), or multiple CNFs.

12. The system of claim 11 further comprising a Network Services Orchestrator (NSO) receiving requests on a northbound interface with a Customer Facing Service (CFS) and a Resource Facing Service (RFS) defined according to an application programming interface (API).

13. The system of claim 12 wherein the RFS includes individual resources.

14. The system of claim 12 wherein the RFS includes an entire slice as a resource.

15. The system of claim 14 wherein a southbound interface is based on European Telecommunications Standards Institute (ETSI) SOL, Internet Engineering Task Force (IETF) and Open Radio Access Network (RAN) specifications of the O-RAN Alliance to accommodate domains natively.

16. At least one non-transitory computer-readable medium that stores instructions that when executed by at least one computer processor cause the at least one computer processor to perform:
electronically pulling artifacts from a vendor gateway to appropriate service provider blocks;
electronically populating containerized network function (CNF) into a service catalog;
electronically building infrastructure via clusters and namespaces, depending on levels of isolation;
electronically building a service on the infrastructure;
electronically running tests on the wireless network system within the infrastructure;
electronically collecting and analyzing logs, traces or events resulting from the running of the tests;
electronically deciding next steps depending on the analysis; and
electronically informing vendors of the outcome of the analysis.

17. The at least one non-transitory computer-readable medium of claim 16 wherein the service is a slice, a containerized network function (CNF), or multiple CNFs.

18. The at least one non-transitory computer-readable medium of claim 17 further comprising a Network Services Orchestrator (NSO) receiving requests on a northbound interface with a Customer Facing Service (CFS) and a Resource Facing Service (RFS) defined according to an application programming interface (API).

19. The at least one non-transitory computer-readable medium of claim 16 wherein the instructions, when executed by the at least one computer processor, further cause the at least one computer processor to perform providing a CI/CD interface allowing for dynamic changes including by instantiating a Resource Facing Service (RFS) for a test slice using the CI/CD interface, which is a same northbound interface on which requests are received with a Customer Facing Service (CFS).

20. The at least one non-transitory computer-readable medium of claim 16 wherein the instructions, when executed by the at least one computer processor, further cause the at least one computer processor to perform using same call-flow for business operations and test processes, but distinguishing the business operations and test processes via tags that are carried until ending of the business operations and test processes.

* * * * *